(12) United States Patent
Buckner

(10) Patent No.: US 9,919,249 B2
(45) Date of Patent: Mar. 20, 2018

(54) METHOD AND SYSTEM TO RECYCLE WATER FOR HYDRO-EXCAVATION

(71) Applicant: Don M. Buckner, Okahumpka, FL (US)

(72) Inventor: Don M. Buckner, Okahumpka, FL (US)

(73) Assignee: VAC-TRON EQUIPMENT, LLC, Okahumpka, FL (US)

( * ) Notice: Subject to any disclaimer, the term of this patent is extended or adjusted under 35 U.S.C. 154(b) by 517 days.

(21) Appl. No.: 14/579,486

(22) Filed: Dec. 22, 2014

(65) Prior Publication Data
US 2016/0175745 A1 Jun. 23, 2016

(51) Int. Cl.
*B01D 33/073* (2006.01)
*C02F 1/00* (2006.01)
*B01D 33/46* (2006.01)

(52) U.S. Cl.
CPC ......... *B01D 33/073* (2013.01); *B01D 33/466* (2013.01); *C02F 1/001* (2013.01); *B01D 2201/265* (2013.01)

(58) Field of Classification Search
CPC .............................. B01D 33/073; B01D 33/466
See application file for complete search history.

(56) References Cited

U.S. PATENT DOCUMENTS

| 2,321,230 A | 6/1943 | Mills et al. | |
|---|---|---|---|
| 3,919,088 A | 11/1975 | Doncer et al. | |
| 4,458,766 A * | 7/1984 | Siegel | E21B 10/60 175/25 |
| 4,510,061 A | 4/1985 | White | |
| 4,511,468 A * | 4/1985 | White | B01D 37/02 210/181 |
| 4,747,961 A * | 5/1988 | Beer | B01D 37/02 175/206 |
| 4,854,058 A | 8/1989 | Sloan et al. | |

(Continued)

FOREIGN PATENT DOCUMENTS

| EP | 0302184 A1 | 2/1989 |
|---|---|---|
| WO | WO8204435 | 12/1982 |

(Continued)

OTHER PUBLICATIONS

Komline-Sanderson, The Komline-Sanderson Rotary Drum Vacuum Filter for Process Filtration, Wastewater Clarification and Sludge Dewatering, catalog, 1996, 8 pp, Peapack, NJ, www.komline.com.

*Primary Examiner* — Bobby Ramdhanie
*Assistant Examiner* — Denise R Anderson
(74) *Attorney, Agent, or Firm* — Matthew G. McKinney, Esq.; Allen, Dyer, Doppelt + Gilchrist, PA

(57) ABSTRACT

A method and system to recycle water for hydro-excavation includes a vacuum hose to remove a slurry of solids and liquid from hydro-excavation at a site. A debris tank is in fluid communication with the vacuum hose and is used to collect the slurry. The system also includes a filter drum, where a portion of the filter drum is configured to rotate through the slurry to filter the liquids from the solids, where dewatered solids are returned to the site for compaction. In addition, an outlet is in fluid communication with a central portion of the filter drum to return filtered water for use in hydro-excavation at the site.

15 Claims, 2 Drawing Sheets

(56) References Cited

U.S. PATENT DOCUMENTS

| | | | |
|---|---|---|---|
| 4,942,929 A | 7/1990 | Malachosky et al. | |
| 5,295,317 A | 3/1994 | Perrott | |
| 6,336,561 B1 | 1/2002 | Kossik et al. | |
| 6,988,568 B2 * | 1/2006 | Buckner | E02F 3/8816 |
| | | | 175/67 |
| 7,503,134 B2 | 3/2009 | Buckner | |
| 7,523,570 B2 | 4/2009 | Pobihushchy | |
| 7,644,523 B2 * | 1/2010 | Buckner | E02F 3/8816 |
| | | | 37/304 |
| 2006/0016599 A1 * | 1/2006 | Badalamenti | E21B 33/14 |
| | | | 166/285 |
| 2006/0032012 A1 | 2/2006 | Buckner | |
| 2008/0179090 A1 * | 7/2008 | Eia | B63B 35/44 |
| | | | 175/5 |
| 2014/0196246 A1 | 7/2014 | Hetcher et al. | |

FOREIGN PATENT DOCUMENTS

| | | | |
|---|---|---|---|
| WO | WO0120121 | 3/2001 | |
| WO | WO 2013103448 A1 * | 7/2013 | E21B 43/16 |

* cited by examiner

METHOD AND SYSTEM TO RECYCLE WATER FOR HYDRO-EXCAVATION

I. FIELD

The present invention relates in general to a method and system to recycle water for hydro-excavation.

II. DESCRIPTION OF RELATED ARTS

Industrial vacuum equipment has dozens of wet and dry uses such as locating underground utilities (potholing), hydro-excavation, air excavation and vacuum excavation. In addition, the equipment can be used for directional drilling slurry removal, industrial clean-up, waste clean-up, lateral and storm drain clean-out, oil spill clean-up and other natural disaster clean-up applications.

In particular, hydro-excavation applications use a combination of high pressure water to dig a hole where the resultant loose soils and water is collected by vacuum into a container or debris tank. The mixture of soils and water is known as a slurry. The hydro-excavation equipment may be mounted to a truck or trailer and is typically powered by gas or diesel engines. The slurry that is removed during excavation is required to be hauled away for disposal. Dry fill materials are then hauled back to the job site to back fill the hole and are compacted in place. The hauling of the slurry away from the job site and hauling new dry material back to the job site and compacting adds time and costs to the project.

In addition, often times there is not an acceptable water source proximate to the site since the high pressure nozzles that are used in hydro-excavation can be easily clogged with material when using native waters from lakes and streams, for example. Typically, water must be hauled to the site, which also increases time and costs to the project. Accordingly, what is needed is a method and system to filter and recycle water on-site and to return original dewatered soil back to the site for compaction in order to reduce time and costs during construction.

However, in view of the prior art at the time the present invention was made, it was not obvious to those of ordinary skill in the pertinent art how the identified needs could be fulfilled.

III. SUMMARY

A method and system to recycle water for hydro-excavation is disclosed. In a particular embodiment, the system includes a vacuum hose to remove a slurry of solids and liquid at a site. A debris tank is used to collect the slurry, where the vacuum hose is in fluid communication with the debris tank. In addition, the system includes a filter drum that is used to filter the solids from the liquid, where a portion of the filter drum is configured to rotate through the slurry contained in a tub, where the tub receives the slurry from the debris tank. The outer surface of the filter drum is a porous membrane. In addition, the system includes an outlet that is in fluid communication with a central portion of the filter drum in order to return filtered effluent back to the site for use in hydro-excavation. A rotary joint connects the outlet to the central portion of the filter drum. A filter pump draws the liquid from the tub through the porous membrane of the filter drum and a blade assembly scrapes dewatered solids collected on an outer surface of the filter drum as the filter drum rotates. The system also includes a trough disposed below the blade assembly to collect the dewatered solids in order to return the dewatered solids to the site for compaction. The filter drum may be coated with a filter aid of diatomaceous earth disposed on the outer surface of the filter drum.

In another particular illustrative embodiment, the method includes vacuuming a slurry of solids and liquid from a hydro-excavation site into a debris tank, rotating a filter drum through the slurry, removing the solids from the liquid as the liquid passes through to a central portion of the filter drum as filtered water, and returning the filtered water from the central portion of the filter drum for use in hydro-excavation. The method also includes returning the dewatered solids from the slurry back to the site for compaction.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
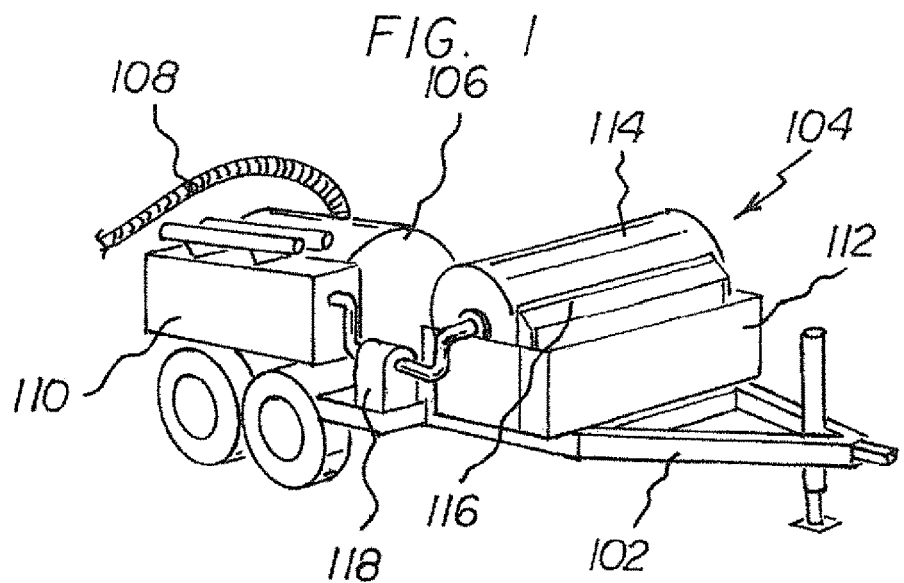
FIG. 1 is an perspective view of a trailer and associated equipment that may be used with a particular embodiment of the system to recycle water for hydro-excavation.

In a particular illustrative embodiment of a system to recycle water for hydro-excavation, a trailer 102 similar to that shown in FIG. 1 may be used to mount the various excavation and filter equipment. The trailer 102 includes a hitch that is used to connect to a vehicle for towing to a site. An adjustable jack is used to stabilize the trailer 102 when the trailer is disconnected from the vehicle. A gasoline or diesel engine may be mounted to the trailer 102 and used to power the vacuum equipment, pumps, filter or any combination thereof. The vacuum hose 108 is connected to a debris tank 106, which is connected to a filter unit 104. The vacuum hose 108 removes the slurry of solids and liquids to the debris tank 106. A water tank 110 supplies the pressurized water for the hydro-excavation.

Figure 2:
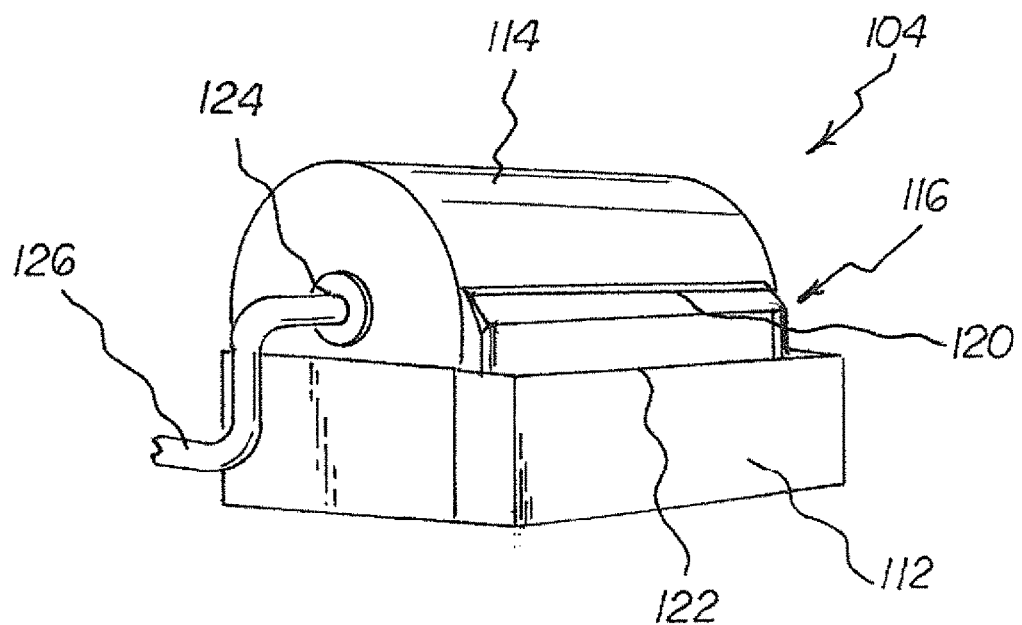
FIG. 2 is a perspective view of a drum filter that may be used with a particular embodiment of the system to recycle water for hydro-excavation.

Once the slurry is collected in the debris tank 106, the solids can be removed from the liquids using the filter unit 104 shown in FIG. 2. A portion of the solids are first removed from the slurry when the slurry is pumped from the debris tank 106 to a tub 112 of the filter unit 104 using a supply pump 130. A primary filter 134 located inside the debris tank 106 prevents a portion of the solids in the slurry from being transferred to the tub 112 so that the larger diameter solids remain in the debris tank 106. Finer solids and suspended solids are transferred to the tub 112 for further filtration.

The filter unit 104 includes a filter drum 114 that is configured to rotate partially through the slurry contained in the tub 112. An outlet conduit 126 is in fluid communication with a central portion of the filter drum 114 to return the effluent of filtered liquid back to the water tank 100 for use in the hydro-excavation. The outer surface of the filter drum 114 may be coated with a filter aid such as diatomaceous earth in order to filter the finer particles from the liquid. In general, the filter aid has a particle size below about 250 microns. The filter aid is deposited as a layer upon the outer surface of the filter drum 114 and is held to such surfaces by the subatmospheric pressures used. Typical thicknesses of the filter aid range from about 1 to 2 inches.

The outer surface of the filter drum 114 is a porous membrane to allow the liquids to flow to the central portion of the filter drum 114 while the solids cannot pass and remain on the outer surface of the filter drum 114. A filter pump 118 is used to provide a negative pressure to the central portion of the filter drum 114 to draw the liquid inward as the drum 114 rotates. A blade assembly 116 is used to scrape dewatered solids collected on an outer surface of the filter drum 114 as the filter drum 114 rotates. The blade assembly 116 includes a longitudinal knife 120 that is disposed adjacent to the outer surface of the filter drum 114. A trough 122 is positioned below the blade assembly 116 to collect the dewatered solids that can be returned back to the site for compaction as needed.

As explained above, the filtered effluent is returned back to the water tank 110 to provide a supply of water for hydro-excavation at the site. In addition, rather than transporting any water to the site, water found at the site may be filtered and used for the hydro-excavation. For example, lake water may be collected using the vacuum hose 108 and then filtered through the filter unit 104 to remove any solids to fill up the water tank 110. Accordingly, no additional water is required to be transported to the site for the hydro-excavation.

The filter unit 104 may be steel, plastic, or any other suitable material. In operation, the filter drum 114 may rotate at the rate of about 1-10 revolutions per minute (rpm) while the tub 112 is supplied with the slurry to be filtered. The level of slurry in the tub 112 is maintained to insure a constant depth of submergence of the lower portion of the filter drum 114. Typical vacuum pressures exerted on the surface of the drum filter 114 during a filtration operation preferably range from about 4 to 12 psig though higher and lower pressures may be employed.

Figure 3:
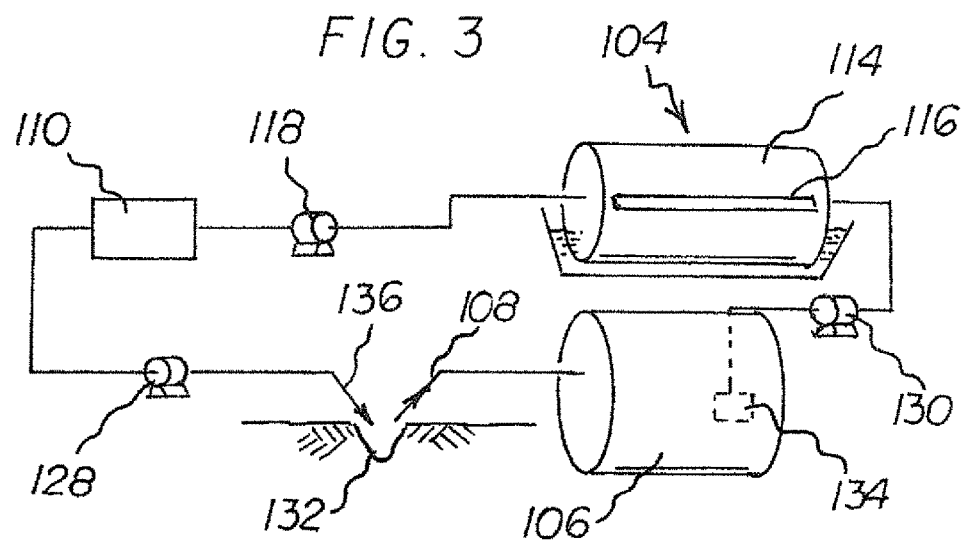
FIG. 3 is a diagram of the system to recycle water for hydro-excavation.

The operation of system is illustrated by the diagram of FIG. 3. The vacuum hose 108 removes the slurry from the ground 132 where the slurry is collected in the debris tank 106. A supply pump 130 pumps the slurry from the debris tank 106, where a debris filter 132 within the debris tank 106 prevents some of the larger debris from being pumped to the tub 112 of the filter unit 104. The filter drum 114 is vacuumized by the filter pump 118. The filter pump 118 is interconnected to the interior central portion of the filter drum 114 by the conduit 126 and the rotary joint 124. Typical pressures maintained range from about 5 to 15 psia, though higher and lower such pressures may be used. The blade assembly 116 scrapes the dewatered solids from the filter drum 114. The filtered effluent is returned to the water tank 110. A high pressure water pump 128 is used to supply high pressure water to the nozzle 138 via the high pressure water line 136.

Using the above indicated pressures and drum rpms, the slurry of liquid and solids undergoes filtration to separate the solids from the liquids. The filtered liquid or effluent is drawn off and collected in the water tank 110 via outlet conduit 126. The solids are collected as a deposit upon the cylindrical surface portions of filter drum 114 as a filter cake and are continuously removed by the knife 120. The solids removed from the filter drum 114 are found to be in a nearly dry condition and can be returned back to the site for compaction.

The porous membrane of the filter drum may range from about 0.02 to 0.15 inch, though larger and smaller sizes may be used. A preferred size is about 0.05 inch. No particular critical dimensions are associated with the filter unit 104, however, in a particular embodiment, the filter unit 104 has a drum with a diameter of from about 12 to 48 inches and preferably in the range from about 24 to 36 inches, and a length of from about 24 to 72 inches. As the filter drum 114 revolves through the slurry, a filtration action occurs while the surface of the filter drum 114 is in the slurry. After the surface of the filter drum 114 emerges from the slurry, but before the filtrate reaches the knife 120, a de-watering action occurs in which free water is drawn away from separated solid materials deposited upon the cylindrical surface of the filter drum 114.

Figure 4:
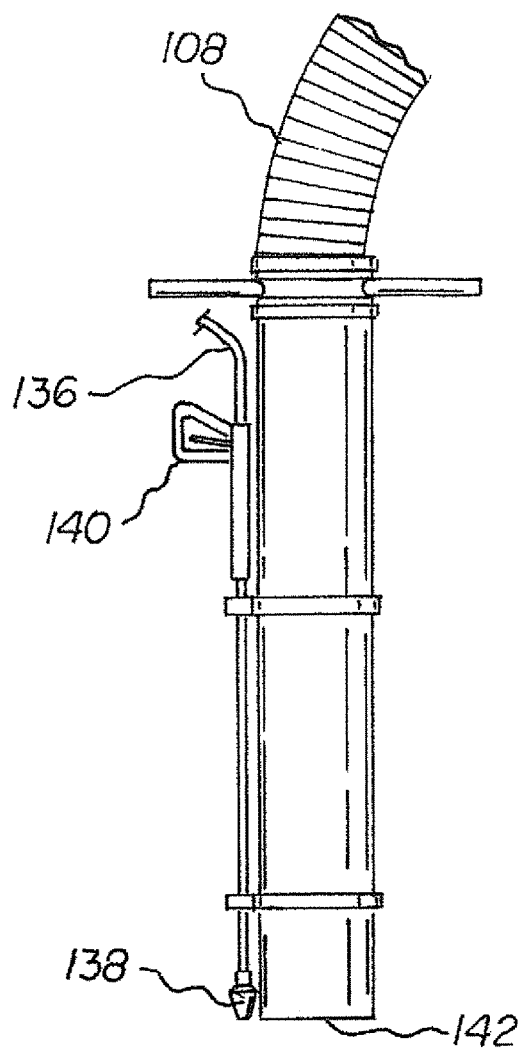
FIG. 4 is an elevational view of a vacuum hose and high pressure wand that may be used with the system to recycle water for hydro-excavation.

Referring now to FIG. 4, a typical vacuum hose 108 having an open end 142 that is used to vacuum the slurry of solids and liquids is shown. The operator grasps handles of vacuum hose 108, which may include a rigid suction wand at a distal end, and applies downward pressure to the ground 132. The vacuum hose 108 vacuums the slurry of soil and water from the hydro-excavation to the debris tank 106. The high pressure water line 136 may be attached along the vacuum hose 108 or may run independently to the high pressure wand 140 and nozzle 138. The high pressure nozzle 138 is susceptible to clogging so that the high pressure water must be relatively free from solids. The high pressure wand 140 may be removed from the vacuum hose 108 and used independently or secured to the side of the vacuum hose 108.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features.

What is claimed is:

1. A system to recycle water for hydro-excavation, the system comprising:
   a water tank having an inlet and an outlet;
   a high pressure water pump coupled to the outlet of the water tank;
   a high pressure water line coupled to the high pressure water pump;
   a vacuum hose having a vacuum to remove a slurry of solids and liquid during hydro-excavation;
   a debris tank coupled to the vacuum hose;
   a filter tub downstream of the debris tank;
   a supply pump coupled to the debris tank and configured to pump the slurry to the filter tub;
   a filter pump having an inlet and an outlet;
   a filter drum having an inside portion coupled to the inlet of the filter pump, wherein a lower outside portion of the filter drum is configured to rotate through the slurry contained in the filter tub in order to separate the liquid from the solids; and
   the outlet of the filter pump coupled to the inlet of the water tank to return filtered effluent for use in hydro-excavation.

2. The system of claim 1, wherein the outer surface of the filter drum comprises a porous membrane.

3. The system of claim 1, the filter drum further comprising a blade assembly adjacent to an outer surface of the filter drum.

4. The system of claim 3, further comprising a trough disposed below the blade assembly.

5. The system of claim 4, the blade assembly further comprising a longitudinal knife.

6. The system of claim 5, further comprising a filter material of diatomaceous earth disposed on the outer surface of the filter drum.

7. The system of claim 6, further comprising a rotary joint coupled between the inlet of the filter pump and the inside portion of the filter drum.

8. The system of claim 7, further comprising a high pressure wand in fluid communication with the high pressure water line.

9. A method to recycle water for hydro-excavation, the method comprising:
   using a high pressure water line coupled to a water tank to dislodge soil during hydro-excavation;
   vacuuming a slurry of solids and liquid into a debris tank during hydro-excavation;
   pumping the slurry from the debris tank to a filter tub downstream of the debris tank;
   rotating a lower outside portion of the filter drum through the slurry contained in the filter tub;
   pumping filtered effluent from the inside of the filter drum back to the water tank for use during hydro-excavation.

10. The method of claim 9, wherein the outer surface of the filter drum comprises a porous membrane.

11. The method of claim 9, further comprising drawing the liquid from the tub through the porous membrane of the filter drum.

12. The method of claim 11, further comprising scraping dewatered solids collected on an outer surface of the filter drum as the filter drum rotates.

13. The method of claim 12, further comprising returning the dewatered solids to the site for compaction.

14. The method of claim 13, further comprising rotating the filter drum at a rate of about 1-10 revolutions per minute.

15. The method of claim 14, further comprising applying a filter material of diatomaceous earth on the outer surface of the filter drum.

* * * * *